United States Patent [19]

Suenaga et al.

[11] Patent Number: 5,766,271
[45] Date of Patent: Jun. 16, 1998

[54] PROCESS FOR PRODUCING SOLID ELECTROLYTE CAPACITOR

[75] Inventors: Kazuhiro Suenaga, Kishima-gun; Tetsuya Kawakubo, Takeo; Shinichi Niwa, Toyonaka; Kourou Yoshimizu, Katano; Tokusaburo Nakamoto; Hidemi Fuchikami, both of Kishima-gun, all of Japan

[73] Assignees: Sanyo Electric Co., Ltd., Osaka; Saga Sanyo Industries Co, Ltd., Kishima-gun, both of Japan

[21] Appl. No.: 562,063

[22] Filed: Nov. 22, 1995

[30] Foreign Application Priority Data

Nov. 24, 1994 [JP] Japan .................................. 6-290173
May 31, 1995 [JP] Japan .................................. 7-134577
Jun. 16, 1995 [JP] Japan .................................. 7-150285

[51] Int. Cl.$^6$ .................................................. H01G 9/15
[52] U.S. Cl. .................................................. 29/25.03
[58] Field of Search ........................ 29/25.03; 361/527, 361/536, 537, 539

[56] References Cited

U.S. PATENT DOCUMENTS

| | | | |
|---|---|---|---|
| 3,735,480 | 5/1973 | Yeamans | 29/570 |
| 4,442,588 | 4/1984 | Omata | 29/570 |
| 4,580,855 | 4/1986 | Niwa | 361/433 |
| 4,591,951 | 5/1986 | Iwamoto et al. | 361/417 |
| 5,031,077 | 7/1991 | Niwa et al. | 361/527 |
| 5,117,333 | 5/1992 | Kakuma et al. | 361/527 |
| 5,580,358 | 12/1996 | Narusawa et al. | 29/25.03 |

FOREIGN PATENT DOCUMENTS

| | | |
|---|---|---|
| A-0 464 605 | 1/1992 | European Pat. Off. . |
| A-12 08 818 | 11/1962 | Germany . |
| A-63-312625 | 12/1988 | Japan . |
| 1-037821 | 2/1989 | Japan . |
| 1-053534 | 3/1989 | Japan . |
| 1-053541 | 3/1989 | Japan . |
| 2-066930 | 3/1990 | Japan . |
| 2-277215 | 11/1990 | Japan . |
| A-3-139817 | 8/1991 | Japan . |
| A-3-196609 | 11/1991 | Japan . |
| A-4-357815 | 10/1992 | Japan . |
| A-4-357812 | 5/1993 | Japan . |
| A-6-120093 | 7/1994 | Japan . |
| A-6-310388 | 11/1994 | Japan . |

*Primary Examiner*—John Niebling
*Assistant Examiner*—Thomas G. Bilodeau
*Attorney, Agent, or Firm*—Armstrong, Westerman, Hattori, McLeland & Naughton

[57] ABSTRACT

A solid electrolyte capacitor comprises a capacitor element disposed in a case, and a rubber seal member tightly fitted in an upper opening of the case, with lead terminals projecting from the element and extending through the seal member. To fabricate the capacitor, a TCNQ complex salt is placed into a heating box and melted by heating. The capacitor element is placed into the box, impregnated with the complex salt, then immediately withdrawn from the box and cooled in air to solidify the salt by cooling. Subsequently, the lead terminals of the element are inserted through the seal member. The element is placed into the case which has approximately the same diameter as the heating box, with the seal member attached to the element, and the case is constricted to seal off its opening, whereby the solid electrolyte capacitor is obtained.

5 Claims, 8 Drawing Sheets

PROCESS FOR PRODUCING SOLID ELECTROLYTE CAPACITOR

FIELD OF THE INVENTION

The present invention relates to solid electrolyte capacitors, and more particularly to solid electrolyte capacitors comprising a capacitor element in the form of a roll and to a process for producing the capacitor.

BACKGROUND OF THE INVENTION

Solid electrolyte capacitors comprise a capacitor element housed in a metal case and filled with a solid electrolyte between its electrodes. The known capacitor elements of such solid electrolyte capacitors include those comprising two aluminum foils and separator paper which are rolled up to give an increased capacitance to the capacitor. Recently, to meet a need to compact electronic apparatus, it is required that these solid electrolyte capacitors be usable as surface mount devices.

The present applicant has already disclosed a solid electrolyte capacitor of the type described and shown in FIGS. 11 to 13 (see U.S. Pat. No. 5,031,077).

With reference to FIG. 12, the disclosed capacitor comprises a capacitor element 7 which is housed in an aluminum case 5 and has lead terminals 6, 6 extending from the element 7 outward from the case 5. The process disclosed for producing the soild electrolyte capacitor is as follows.

First to prepare the capacitor element 7, aluminum foil of high purity is chemically treated and thereby rought-surfaced, and etched. The aluminum foil is then subjected to a chemical conversion treatment to form an oxide film electrochemically over the foil surface.

As shown in FIG. 11, insulating separator paper 72 which is Manila paper is interposed between the aluminum foil thus etched and chemically coated to serve as an anode foil 70 and a cathode foil 71 opposed to the foil 70. With lead terminals 6, 6 secured to the respective foils 70, 71 by crimping, the foils 70, 71 are rolled up, and a retainer tape 73 is wound around the roll to obtain a capacitor element 7. The cut faces of the anode foil 70 of this element are further subjected to a chemical conversion treatment.

Next, the capacitor element 7 is heat-trated to carbonize the separator paper 72, whereby the fiber is made finer and thereby rendered easier to impregnate with an electroltye.

Meanwhile in a separate step, a powder of TCNQ complex salt 2 serving as the electrolyte is placed in a suitable amount into a case 5 having a top opening as seen in FIG. 13, and the case 5 is heated to melt the TCNQ complex salt 2. "TCNQ" means 7,7,8,8-tetracyanoquinodimethane. To be suitable, the TCNQ complex salt 2 is of the isoquinoline type.

The capacitor element 7 is then inserted into the case 5. After the element 7 is impregnated with the molten TCNQ complex salt, the case 5 is immediately cooled to solidify the salt 2. This step has been disclosed by the applicant in U.S. Pat. Nos. 4,580,855 and 5,117,333.

Finally, the top opening of the case 5 is closed with a sealant 3 comprising an epoxy resin.

On the other hand, an elastic member of rubber or the like is used for sealing off common electrolytic capacitors wherein the capacitor element is impregnated with an electrolyte. FIG. 14 shows an electrolyte-impregnated capacitor element 7a housed in a case 5 which is closed with such a rubber seal member 4 by inserting lead terminals 6, 6 of the element 7a through two through holes 40, 40 of the seal member 4 and curling the case 5. Furthermore, the capacitor is usable for surface mounting with its lead terminals 6, 6 bent to a shape suitable for surface mounting (see, for example, U.S. Pat. No. 4,591,951).

When such a seal member 4 is to be used simply for sealing in preparing the solid electrolyte capacitor comprising the TCNQ complex salt 2, two methods are considered feasible. One of these methods is such that the capacitor element 7 having the seal member 4 attached thereto is placed into the case 5 and impregnated with the complex salt 2 which is melted to a liquid within the case 5 in advance, and the opening portion of the case 5 is thereafter curled to close the opening with the seal member 4. With the other method, the capacitor element 7 is placed into the case 5 without attaching the seal member 4 to the element 7 and impregnated with the TCNQ complex salt 2 as melted in the case 5, the seal member 4 is thereafter fitted into the opening of the case 5 with the lead terminals 6, 6 inserted through the member 4, and the opening portion is curled.

The practice of these three opening-closing or sealing methods and the use of the resulting capacitors for surface mounting have revealed that the methods still remain to be improved with respect to the following drawbacks.

1. With the method of closing the opening of the case 5 with the sealant 3 of epoxy resin after the capacitor element 7 is impregnated with the TCNQ complex salt 2 as shown in FIG. 12, the capacitor element 7 is prone to be positioned eccentrically of the case 5 if the clearance between the element 7 and the inner surface of the case 5 is great. In this case, the lead terminals 6, 6 which should be arranged symmetrically on opposite sides of the center of the case 5 as shown in FIG. 15A are displaced as seen in FIG. 15B or FIG. 15C.

This fault leads to a dimensional error of the solid electrolyte capacitor as a product. Especially the displacement of the lead terminals 6, 6 relative to the case 5 leads to misregister of the case 5 relative to a printed circuit board when the capacitor is mounted on the board.

Further because the epoxy resin is viscous, there is the problem that the layer of sealant 3 becomes raised around the lead terminals 6, 6. Especially when the capacitor is to be surface-mounted as the vertical chip type as disclosed in the aforementioned U.S. Pat. No. 4,591,951, the layer of sealant 3, if locally raised, is likely to result in a fault in attaching the capacitor to a surface mount seat.

2. When the capacitor element 7 having the seal member 4 attached thereto is placed into the case 5 and impregnated with the TCNQ complex salt 2 within the case 5, the preheating of the element needed is likely to thermally expand, deform or degrade the seal member 4. It is then likely that the seal member 4 can not be inserted into the case 5. This problem must be solved by forming the seal member 4 from a material of high heat resistance, whereas a suitable material has not been found.

3. In the case where the capacitor element 7 is placed into the case 5 without attaching the seal member 4 to the element 7 and impregnated with the TCNQ complex salt 2 within the case 5, and the seal member 4 is thereafter fitted into the opening of the case 5, the seal member 4 needs to be fitted into the case 5 while inserting the lead terminals 6, 6 through the holes 40, 40 of the seal member 4. The seal member 4 is therefore not fittable efficiently, while this method has the foregoing problem that the lead terminals 6, 6 are not positioned in the center.

4. Generally TCNQ complex salts 2 are up to 230° C. in melting point, so that in surface mounting, the complex salt 2 is liable to melt owing to the thermal stress of soldering. The sealant 3, when used for closing the opening of the case 5, fills up a clearance between the inner surface of the case 5 and the capacitor element 7, with the result that the TCNQ complex salt 2 expanding on melting is likely to leak from between the sealant 3 and the terminals 6, 6 or from between the case inner surface and the sealant 3.

To overcome this problem, the present applicant has already disclosed TCNQ complex salts having a melting point of over 230° C. in U.S. Pat. No. 5,031,077. However, these TCNQ complex salts are generally lower in electric conductivity than those having a melting point of up to 230° C. For this reason, the solid electrolyte capacitor incorporating such a TCNQ complex salt still has the problem of being great in equivalent series resistance and inferior in high-frequency characteristics.

5. When to be used for surface mounting, solid electrolyte capacitors of this type generally have their lead terminals 6, 6 bent and cut to a specified length. However, with the capacitor wherein the opening of the case 5 is closed with the seal member 4, the capacitor element 7 is also subjected to a bending load due to the bending to result in the likelihood of cracks developing in the electrode foil or the solid electrolyte (TCNQ complex salt as solidified) inside the capacitor element 7, consequently breaking or damaging the dielectric coating of the electrode foil, i.e., the oxide film formed by chemical conversion treatment and possibly permitting occurrence of a leakage current fault.

6. When the capacitor element 7 is treated for the carbonization of the separator paper 72, the fibers of the paper become finer to give a reduced thickness to the paper, consequently shrinking the separator paper 72 and creating a radial clearance between the overlapping portions of the paper 72 and the electrode foils 70, 71 to reduce the winding strength. If the capacitor element 7 in this state comes into contact with the inner surface of the case 5 and subjected to a light impact when the element 7 is inserted into the case 5, the separator paper 72 is likely to become unwound to loosen the capacitor element 7 as shown in FIG. 16. It is then impossible to impregnate the element 7 with the TCNQ complex salt 2 and to fabricate a solid electrolyte capacitor.

SUMMARY OF THE INVENTION

An object of the present invention is to provide a solid electrolyte capacitor wherein the lead terminals are positioned in place without displacement relative to its case and which has a flawless appearance.

Another object of the invention is to provide a production process wherein the seal member is made free of thermal deformation, expansion or degradation and which ensures an improved assembling efficiency.

Another object of the invention is to make the seal member fittable into the opening of the case in the production process with an improved efficiency and free of imperfections.

Another object of the invention is to use as the electrolyte a TCNQ complex salt having a melting point of up to 230° C. to give improved high-frequency characteristics while eliminating the likelihood of the TCNQ complex salt oozing out when melted during soldering.

Another object of the invention is to lessen the load to be exerted on the capacitor element when the lead terminals are bent to prevent the capacitor element from cracking.

Still another object of the invention is to prevent the capacitor element from loosening after the element is treated for carbonization.

In the process of the invention for producing a solid electrolyte capacitor, a capacitor element 7 is impregnated with an electrolyte within a heating box 8 and thereafter withdrawn from the heating box 8 to solidify the impregnating electrolyte by cooling. In this state, lead terminals 6, 6 are inserted through a seal member 4, and the capacitor element 7 having the seal member 4 fitted thereto is placed into a case 5.

Since the seal member 4 is fitted on the lead terminals 6, 6 after the capacitor element 7 has been cooled, the seal member 4 is unlikely to thermally deform or become degraded. The step of inserting the lead terminals 6, 6 through the seal member 4 is separate from the step of fitting the seal member 4 into the case 5. This eliminates the difficulty conventionally encountered in inserting the seal member 4 into the case 5, rendering the seal member 4 fittable into the case 5 perfectly.

To reinforce the lead terminals 6, 6, the step of applying a reinforcing material 30 to the upper surface of the capacitor element 7 may be added to the process before the step of inserting the lead terminals 6, 6 through the seal member 4. To reinforce the lead terminals 6,6, the step of applying the reinforcing material 30 to the upper surface of the seal member 4 may be added to the process after the step of inserting the lead terminals 6, 6 through the seal member 4.

With the lead terminals 6, 6 reinforced by the reinforcing material 30, the bending load produced when the lead terminals 6, 6 are bent is supported by the joint of the reinforcing material 30 and the lead terminals 6, 6, lessening the load to be exerted on the capacitor element 7. This prevents the capacitor element 7 from becoming damaged, precluding occurrence of a leakage current.

Furthermore, an adhesive composition 31 may be applied to the upper or lower surface of the capacitor element 7 before the capacitor element 7 is impregnated with the electrolyte after the element 7 has been treated for carbonization.

In this case, the capacitor element 7 is coated with the adhesive composition 31 first, then placed into and withdrawn from the heating box 8 and therefore unlikely to loosen even if lightly colliding with the heating box 8 when placed into or withdrawn from the box 8. The loosening is avoidable also when the capacitor 7 is placed into the case 5.

The step of applying the adhesive composition 31 to the peripheral surface of the capacitor element 7 may further be added to the process between the step of withdrawing the element 7 from the heating box 8 after the impregnation and the step of placing the element 7 into the case 5.

The adhesive composition 31 applied to the peripheral surface of the capacitor element 7 prevents the capacitor element 7 from loosening owing to the contact thereof with the case 5 when the element 7 is placed into the case 5. The composition applied also prevents the peripheral surface of the capacitor element 7 from coming into direct contact with the inner surface of the case 5, precluding the element 7 from short-circuiting.

The solid electrolyte capacitor embodying the present invention further has a hollow portion 50 between the capacitor element 7 and the inner surface of the case 5. Accordingly, even if a TCNQ complex salt 2, serving as the electrolyte, melts during soldering, the molten salt 2 fills the hollow portion 50, which eliminates the likelihood of the molten salt 2 leaking from the case 5, consequently assuring surface mounting work of safety. The TCNQ complex salt 2 can be up to 230° C. in melting point and therefore gives satisfactory high-frequency characteristics.

DETAILED DESCRIPTION OF EMBODIMENTS

Embodiment 1

Figure 1:
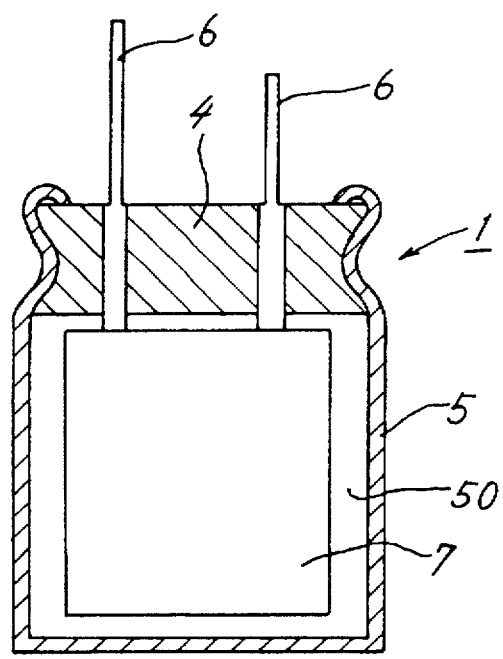
FIG. 1 is a view showing a solid electrolyte capacitor of the invention with its case broken away.

Techniques for surface mounting solid electrolyte capacitors of the type described will be described with reference to the drawings concerned;

FIG. 1 shows a solid electrolyte capacitor 1 comprising a capacitor element 7 which is disposed inside an aluminum case 5. The capacitor element 7 has lead terminals 6, 6 projecting therefrom and inserted through a seal member 4 which is tightly fitted in a top opening of the case 5.

Figure 2:
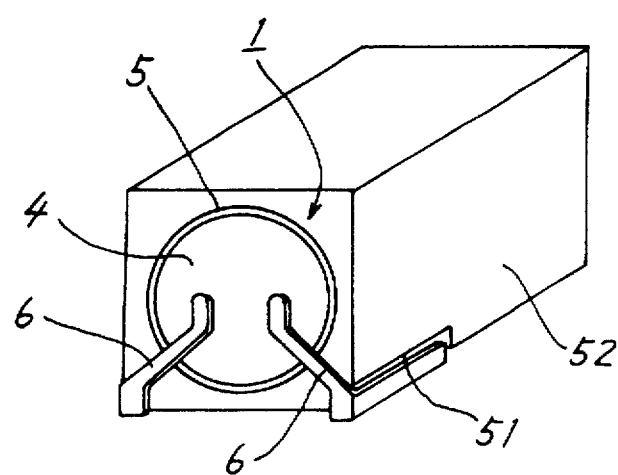
FIG. 2 is a perspective view of the capacitor as adapted for surface mounting in a horizontal position.

In the case where the solid electrolyte capacitor 1 is to be surface-mounted in a horizontal position, the capacitor 1 is further placed into an outer frame 52 in the form of a square tube, and the lead terminals 6, 6 are bent along respective opposite sides of the outer frame 52 and fitted respectively into grooves 51, 51 formed in the frame outer sides as shown in FIG. 2.

Figure 3:
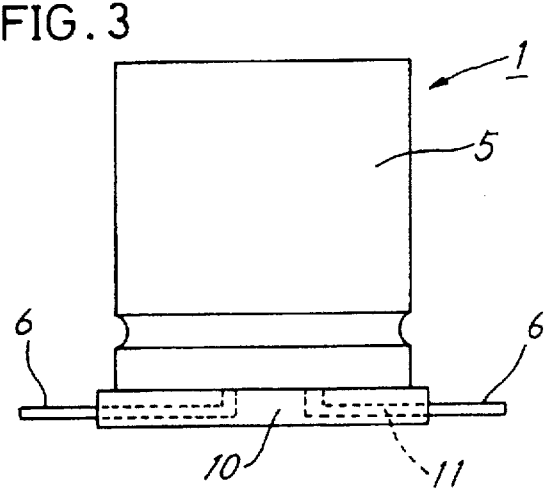
FIG. 3 is a side elevation of the capacitor as adapted for surface mounting in a vertical position.

Alternatively in the case where the capacitor 1 is to be surface-mounted in a vertical position, the lead terminals 6, 6 are inserted through a seat 10 of synthetic resin as seen in FIG. 3. The seat 10 is formed in its lower surface with a recess 11. The outer ends of the lead terminals 6, 6 are bent and placed into the recess 11, and the capacitor 1 is mounted on the seat 10.

The seat 10 is attached to position the capacitor 1 upright with good stability for surface mounting and to hold the terminals 6, 6 out of direct contact with the lower end peripheral portion of the case 5. This technique has already been disclosed in U.S. Pat. No. 4,591,951.

The proposal of the present applicant relates to a process for producing the solid electrolyte capacitor 1 chiefly for surface mounting as will be described below in detail.

Figure 4:
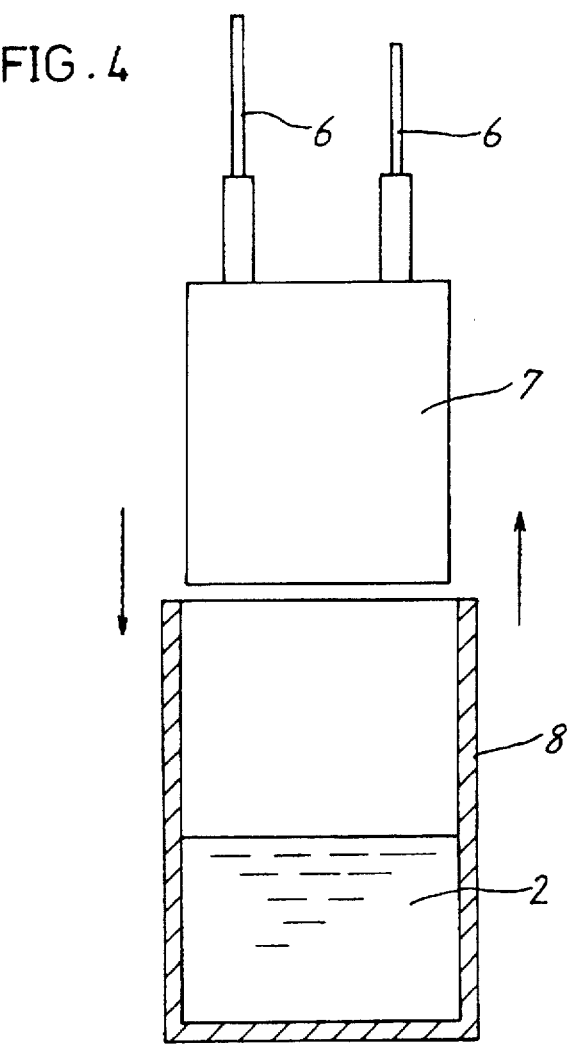
FIG. 4 is a view showing a capacitor element before it is placed into or as it is withdrawn from a heating box.

With reference to FIG. 4, a capacitor element 7 is prepared first as in the prior art. Meanwhile, a heat box 8 is prepared which has approximately the same diameter as the case 5, and a suitable amount of TCNQ complex salt 2 is placed into the box 8 and melted by heating. The capacitor element 7 as preheated is then placed into the box 8, whereby the separator paper 72 of the element is impregnated with the molten TCNQ complex salt 2. The heating box 8 is given approximately the same size as the case 5 to impregnate capacitor elements 7 with an approximately constant amount of TCNQ complex salt 2 and to make it possible to rapidly heat and rapidly cool the complex salt 2 in the impregnation step.

The present embodiment is characterized by the subsequent steps. After the element 7 has been impregnated with the TCNQ complex salt 2, the element 7 is immediately withdrawn from the heating box 8 and cooled in air to solidify the complex salt 2 by cooling.

Figure 5:
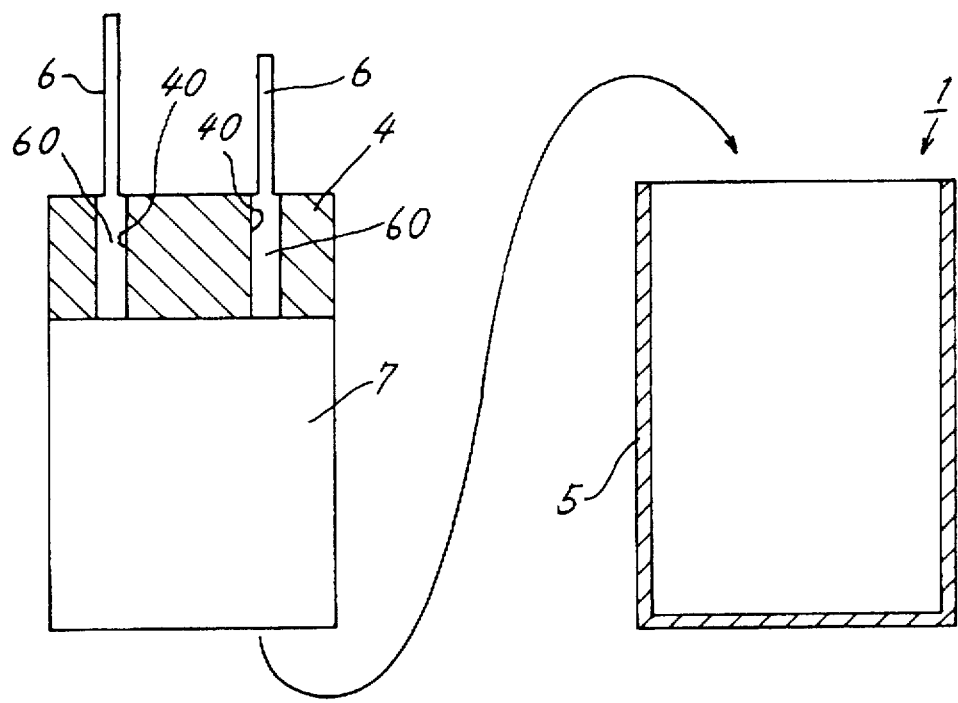
FIG. 5 is a diagram showing the step of placing into the case the capacitor element having a seal member attached thereto after impregnation.

With reference to FIG. 5, the lead terminals 6, 6 of the capacitor element 7 are inserted through holes 40, 40 of a seal member 4 of rubber, and lead bosses 60, 60 which are the base ends of the terminals 6, 6 are tightly fitted into the respective holes 40, 40. The capacitor element 7 having the seal member 4 fitted thereto is then placed into the case, and the opening of the case 5 is closed by constricting the case as shown in FIG. 5.

With the production process described, the seal member 4 is fitted to the capacitor element 7 as cooled in the air and is therefore unlikely to thermally deform unlike the conventional one. The step of inserting the lead terminals 6, 6 through the seal member 4 is separate from the step of fitting the seal member 4 to the case 5. This eliminates the difficulty conventionally encountered in inserting the seal member 4 into the case 5, rendering the member 4 fittable in place perfectly.

Further since epoxy resin is not used for sealing the case 5, the conventional problem of raised epoxy resin is avoidable. This facilitates surface mounting of the solid electrolyte capacitor of the vertical type in particular, further obviating the likelihood of an increase in leakage current due to the expansion of epoxy resin during soldering and eliminating the need to control the viscosity of epoxy resin. With the embodiments to follow, the fabrication of the solid electrolyte capacitor 1 involves impregnation with the TCNQ complex salt 2 and the subsequent step of withdrawing the capacitor element 7 from the heating box 8.

The applicant prepared two kinds of solid electrolyte capacitors 1, 10 V–4.7 µF and 6.3 V–15 µF in rated voltage and capacitance. Fifty capacitors with a sealant 3 of epoxy resin for closing the opening of the case 5, and fifty capacitors with a seal member 4 of rubber were prepared for each kind and tested for resistance to soldering heat. Table 1 shows the results.

TABLE 1

| Seal | Rating | Reject ratio* |
|---|---|---|
| Rubber | 10 V - 4.7 μF | 0/50 |
| Resin | | 3/50 |
| Rubber | 6.3 V - 15 μF | 0/50 |
| Resin | | 2/50 |

*The ratio of the number of rejects due to a faulty leakage current to the total number of capacitors tested.

For testing, the capacitor 1 was heated at 150° C. for 120 seconds, soldering heat of 230° C. was then applied to the lead terminals 6, 6 for 10 seconds, and the capacitor was thereafter checked for a faulty leakage current. The results given in Table 1 reveal that the capacitors 1 wherein the rubber seal member 4 was used are all free from the fault. This indicates that the capacitors 1 prepared by the production process of the present embodiment are made less susceptible to leakage current faults than those wherein the case 5 is closed with the epoxy resin sealant 3.

Embodiment 2

As shown in FIG. 1, the solid electrolyte capacitor 1 fabricated by the production process described has a hollow portion 50 formed between the capacitor element 7 and the inner surface of the case 5 with the peripheral surface of the element 7 held out of contact with the case inner surface.

With conventional solid electrolyte capacitors, the TCNQ complex salt 2 impregnating the capacitor element 7 melts during soldering and is likely to leak from the case 5 as previously stated. With the capacitor 1 of the present embodiment, the hollow portion 50 is formed around the capacitor element 7 inside the case 5. Even when melted by soldering, the TCNQ complex salt 2 therefore merely fills part of the hollow portion 50 and is unlikely leak out of the case 5. This assures surface mounting work of safety and further permits use of TCNQ complex salts having a melting point of up to 230° C.

When incorporating a TCNQ complex salt exceeding 230° C. in melting point, the solid electrolyte capacitor 1 is found somewhat inferior in high-frequency characteristics. TCNQ complex salts 2 having a melting point of up to 230° C. and high electric conductivity are usable in the solid electrolyte capacitor 1 of the present embodiment, which is accordingly satisfactory in high frequency characteristics.

The applicant prepared four kinds of electrolytes, i.e., N-n-butyl.isoquinolinium.$TCNQ_2$, N-n-amyl.isoquinolinium.$TCNQ_2$ and N-iso-amyl.isoquinolinium. $TCNQ_2$ which are TCNQ complex salts with a melting point of up to 230° C., and a mixture of N,N'-pentamethylene.(3,5-lutidine)$_2$.(TCNQ)$_4$ and N-phenethyl.3,5-lutidine.(TCNQ)$_2$ which is over 230° C. in melting point. Solid electrolyte capacitors having a rated capacity of 4.7 μF were fabricated using these electrolytes, and tested for characteristics.

Table 2 shows particulars of experimental examples and comparative examples, i.e., complex salts serving as the electrolytes for the capacitors 1, the melting points thereof and which of the seal member 4 and sealant 3 was used for sealing off the case 5.

TABLE 2

| | Electrolyte | M.p. (°C.) | Seal |
|---|---|---|---|
| Exp. Ex. 1 | N-n-butyl.isoquinolinium.$TCNQ_2$ | About 215 | Rubber |
| Comp. Ex. 1 | N-n-butyl.isoquinolinium.$TCNQ_2$ | About 215 | Resin |
| Comp. Ex. 2 | Mixture of N,N'-pentamethylene.(3,5-lutidine)$_2$.(TCNQ)$_4$ and N-phenethyl.3,5-lutidine.(TCNQ)$_2$ | About 250 | Resin |
| Exp. Ex. 2 | N-n-amyl.isoquinolinium.$TCNQ_2$ | About 215 | Rubber |
| Exp. Ex. 3 | N-iso-amyl.isoquinolinium.$TCNQ_2$ | About 220 | Rubber |

Listed in Table 2 above are Comparative Examples 1 and 2 wherein the sealant 3 was used for filling up the clearance between the capacitor element 7 and the inner surface of the case 5 and closing the case opening, and Experimental Examples 1, 2 and 3 wherein the case opening was closed with the seal member 4, and the hollow portion 50 was formed inside the case 5.

The solid electrolyte capacitors 1 listed in Table 2 were subjected to a reflow test simulating the thermal stress involved in soldering. Table 3 shows the data obtained by checking the capacitors before and after the test for equivalent series resistance ESR, capacitance C and tangent of loss angle tan δ. For the reflow test, the capacitors were held in a steam of 230° C. for 30 seconds using a VPS device.

TABLE 3

| | Before reflow test | | | After reflow test | | |
|---|---|---|---|---|---|---|
| | C (μF) | tan δ (%) | ESR (Ω) | C (μF) | tan δ (%) | ESR (Ω) |
| Exp. Ex. 1 | 4.99 | 2.8 | 0.111 | −3.38 | 6.1 | 0.155 |
| Comp. Ex. 1 | 4.95 | 1.1 | 0.115 | | Oozing | |
| Comp. Ex. 2 | 5.17 | 4.3 | 0.305 | −9.67 | 7.8 | 0.364 |
| Exp. Ex. 2 | 4.95 | 2.4 | 0.106 | −3.83 | 5.2 | 0.182 |
| Exp. Ex. 3 | 4.82 | 2.7 | 0.108 | −2.85 | 4.6 | 0.171 |

A comparison between Experimental Examples 1, 2 and 3 and Comparative Example 1 in Table 3 reveals that the capacitors 1 of Experimental Examples 1 to 3 having the hollow portion 50 inside the case 5 did not permit a melt of TCNQ complex salt to ooze out from the case, hence no fault. Further a comparison between Experimental Examples 1 to 3 wherein the TCNQ complex salts used were up to 230° C. in melting point and Comparative Example 2 wherein the TCNQ complex salts used were above 230° C. in melting point indicates that the capacitors 1 of the former were smaller in equivalent series resistance and tangent of loss angle before and after the test and also in capacitance variation (ΔC/C) due to the test, thus exhibiting satisfactory characteristics.

Embodiment 3

Figure 6:
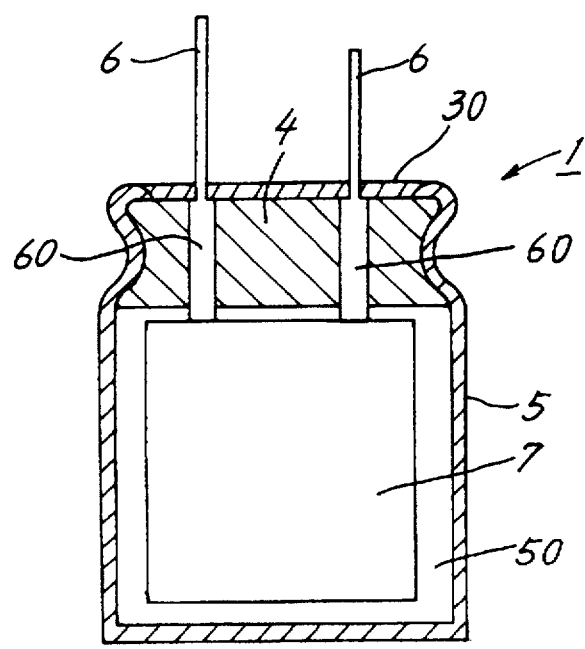
FIG. 6 is a view showing a capacitor with its case broken away, the capacitor being coated with a reinforcing material over the upper surface of the seal member.

FIG. 6 shows the solid electrolyte capacitor of FIG. 1 to which a reinforcing material 30 comprising an epoxy resin is applied over the upper surface of its seal member 4 to reinforce the lead terminals 6, 6. In the production process described with reference to Embodiment 1, the reinforcing material 30 is applied to the upper surface of the seal member 4 after inserting the lead terminals 6, 6 of the capacitor element 7 through the seal member 4, placing the element 7 into the case 5 with the seal member 4 attached to the element 7 and constricting the case 5.

In the case where solid electrolyte capacitors are used for surface mounting, those sealed with the seal member 4 have the likelihood that when the lead terminals 6, 6 are bent, the resulting bending load will act on the capacitor element 7 to cause damage to the element 7 and a leakage current fault. With the present embodiment wherein the terminals 6, 6 are reinforced with the reinforcing material 30, the bending load resulting from the bending of the terminals 6, 6 is supported by the joint between the reinforcing material 30 and the terminals 6, 6 to diminish the load on the capacitor element 7. This protects the element 7 from damage and mitigates the leakage current fault.

In each of the examples listed in Table 4, 100 solid electrolyte capacitors were prepared with the rating of 16 V–3.3 μF or 10 V–3.3 μF, with the upper surface of the seal member 4 coated with the reinforcing material 30 or uncoated, and checked for the occurrence of a leakage current fault after bending the lead terminals 6, 6. The seal member 4 was coated with the reinforcing material 30 in Experimental Examples 4 and 5, while the seal member was left uncoated in Comparative Examples 4 and 5.

TABLE 4

|  | Rating | Seal | Reject ratio* |
| --- | --- | --- | --- |
| Exp. Ex. 4 | 16 V - 3.3 μF | Rubber coated with resin | 0/100 |
| Comp. Ex. 4 | 16 V - 3.3 μF | Rubber only | 7/100 |
| Exp. Ex. 5 | 10 V - 10 μF | Rubber coated with resin | 0/100 |
| Comp. Ex. 5 | 10 V - 10 μF | Rubber only | 10/100 |

*Same as in Table 1.

With Experimental Example 1, the reinforcing material 30, available as a single-pack epoxy resin, was applied to the capacitor 1 and thereafter allowed to stand at 100° C. for 2 hours for curing. In the case of Experimental Example 5, the reinforcing material, available as a two-pack epoxy resin, was applied to the capacitor and thereafter allowed to stand at 85° C. for 3 hours for curing. The data given in Table 4 reveals that the capacitors having the reinforcing material 30 applied to the lead terminals 6, 6 are low in reject ratio and effectively protected from a leakage current fault.

Figure 7:
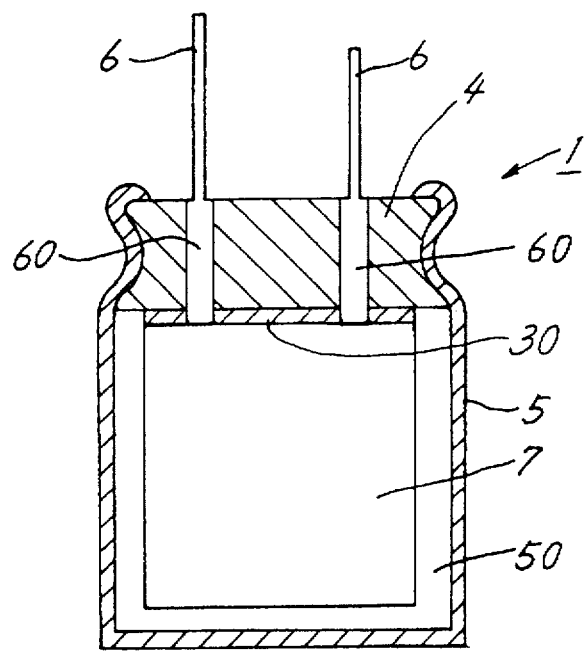
FIG. 7 is a view showing a capacitor with its case broken away, the capacitor being coated with the reinforcing material over the upper surface of its capacitor element.

As shown in FIG. 7, the lead terminals 6, 6 may be reinforced by applying the reinforcing material 30 to the upper surface of the capacitor element 7. However, the reinforcing material 30 applied to the upper surface of the seal member 4, unlike the material 30 applied to the upper surface of the element 7, also has an effect to make the seal member 4 impermeable to air and hold the TCNQ complex salt 2 inside the case 5 completely out of contact with the outside air.

Stated more specifically, the seal member 4 is made of rubber and therefore porous, so that the outside air enters the case 5 through invisible minute holes in the seal member 4, whereas it is known that if the TCNQ complex salt 2 is held exposed to the water vapor in the air, the salt becomes degraded with time to lower the capacitance of the capacitor 1. Accordingly, the reinforcing material 30 applied to the upper surface of the seal member 4 blocks the flow of the outside air into the case 5, preventing the reduction in the capacitance of the capacitor 1.

The reinforcing material 30 applied to the upper surface of the capacitor element 7 as shown in FIG. 7 is less effective for blocking the passage of air since air flows into the case 5 through minute pores in the seal member 4.

The applicant prepared 50 solid electrolyte capacitors 1 having the reinforcing material 30 applied to the upper surface of the seal member 4 (see FIG. 6) for Experimental Example 6, and 50 capacitors without the reinforcement for Comparative Example 6. These capacitors were subjected to a humidity test in an environment having a temperature of 60° C. and a humidity of 90% for 2,000 hours and thereafter checked for variations in capacitance. Table 5 shows the average value and maximum value of the variations.

TABLE 5

|  | Capacitance variation | |
| --- | --- | --- |
|  | Average | Maximum |
| Exp. Ex. 6 | 1.6% | 2.2% |
| Comp. Ex. 6 | 4.4% | 6.5% |

The test demonstrates that the capacitors coated with the reinforcing material 30 over the seal member 4 are smalller than the uncoated capacitors in the variation of capacitance.

Embodiment 4

Figure 8:
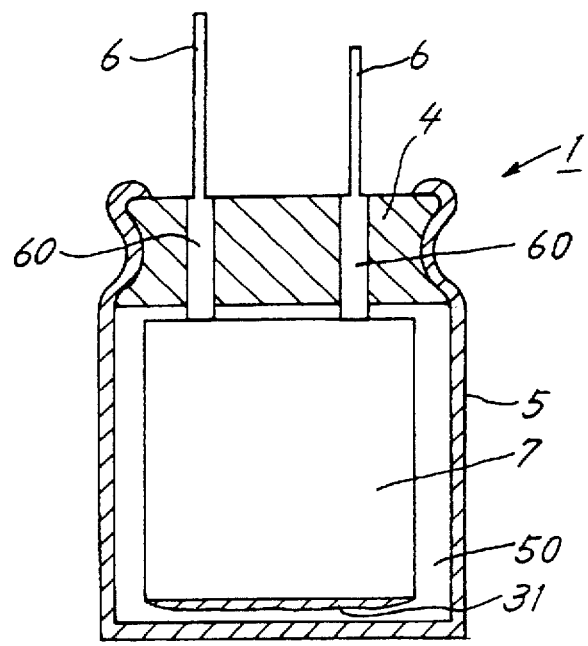
FIG. 8 is a view showing a capacitor with its case broken away, the capacitor being coated with an adhesive composition over the lower surface of its capacitor element.

FIG. 8 shows a solid electrolyte capacitor 1 having a hollow portion 50 formed between its capacitor element 7 and case 5 and coated with an adhesive composition 31 over the lower surface of the element 7.

The adhesive composition 31 for use in the present embodiment comprises polyvinyl alcohol, or polyvinyl pyrrolidone and epoxy resin. After the capacitor element 7 has been formed, the composition 31 is applied to the element 7 before it is inserted into the heating box 8. The same steps as for Embodiment 2 thereafter follow. The adhesive composition 31 may comprise materials other than those mentioned above, but such materials need to withstand the heating involved in the impregnation with the TCNQ complex salt 2.

Conventional solid electrolyte capacitors have the likelihood that the capacitor element 7 will loosen if lightly colliding with the case 5 while the element 7 is being placed into the case 5. With the present embodiment, however, the adhesive composition 31 is applied to the capacitor element 7 first to fix the separator paper 72 to the electrode foils 70, 71, and the element 7 is thereafter placed into and withdrawn from the heating box 8, so that the capacitor element 7 is unlikely to loosen even if lightly colliding with the heating box 8. Similarly, the capacitor element 7 will not loosen when placed into the case 5.

The present applicant prepared many capacitor elements 7 having a diameter of 10 mm using separator paper 72 with a width of 3 mm. Some of the elements 7 were each coated with 5 mg of an adhesive composition 31 comprising an epoxy resin over the lower surface thereof, followed by curing at 150° C. for 30 minutes. Some of the capacitor elements 7 were each coated with 20 mg of an adhesive composition 31, consisting primarily of polyvinyl alcohol instead of epoxy resin, over the lower surface of the element, followed by curing. The other elements 7 were left uncoated with the composition 31. Solid electrolyte capacitors 1 were fabricated using these three kinds of capacitor elements 7. Consequently, the trouble of loosening occurred in none of the capacitor elements 7 coated with either one of the adhesive compositions 31.

Embodiment 5

Figure 9:
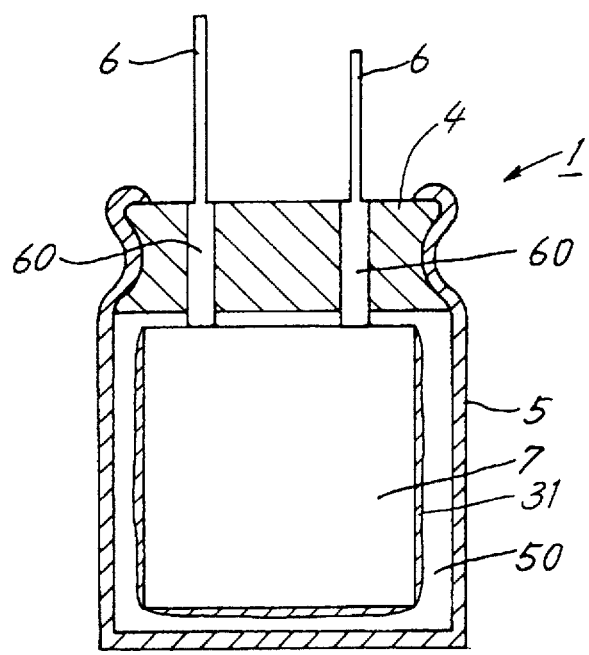
FIG. 9 is a view showing a capacitor with its case broken away, the capacitor being coated with the adhesive composition over the lower surface and peripheral surface of its capacitor element.
Figure 10:
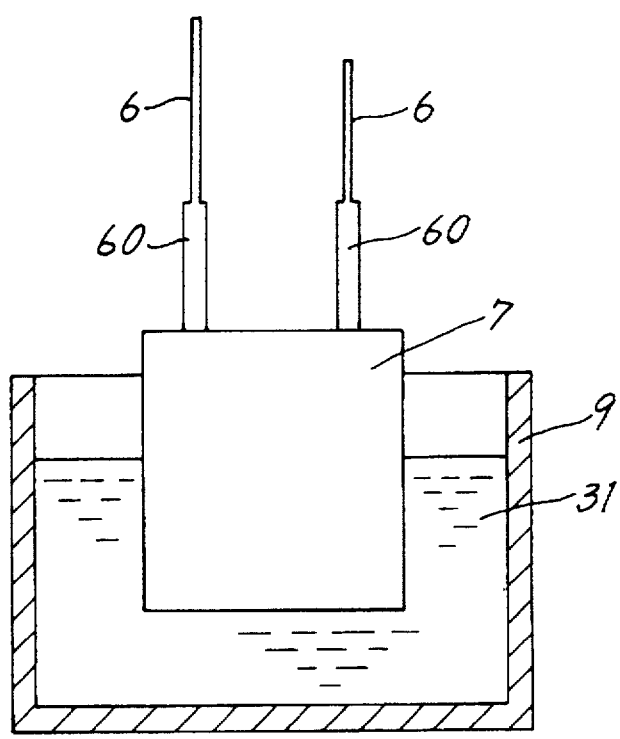
FIG. 10 is a view showing the step of applying the adhesive composition to the capacitor element.
Figure 11:
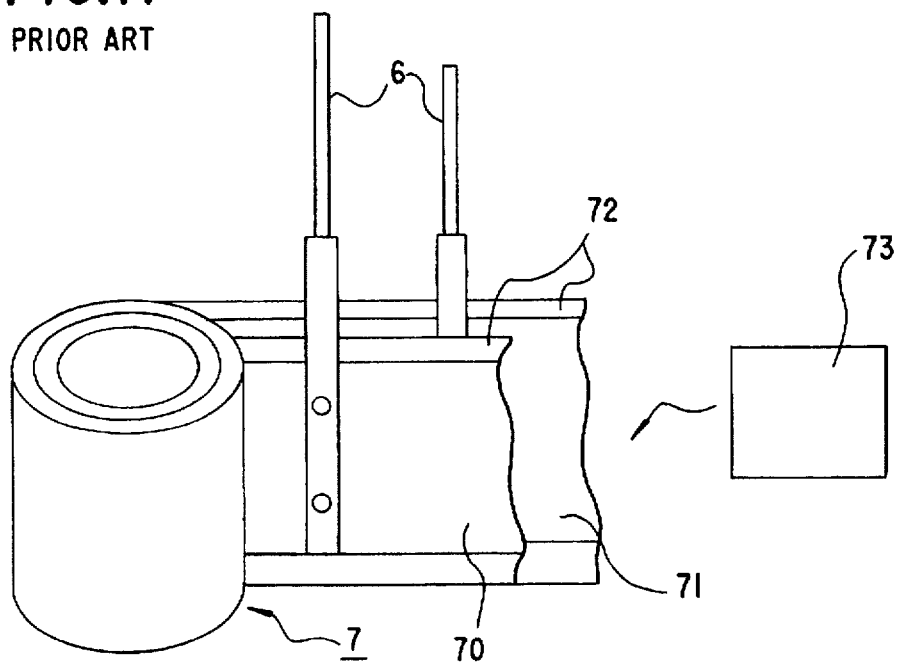
FIG. 11 is an exploded perspective view of the capacitor element.
Figure 12:
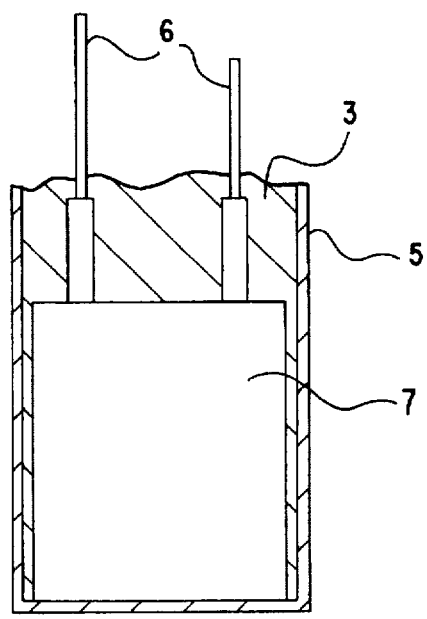
FIG. 12 is a view showing a conventional solid electrolyte capacitor with its case broken away.
Figure 13:
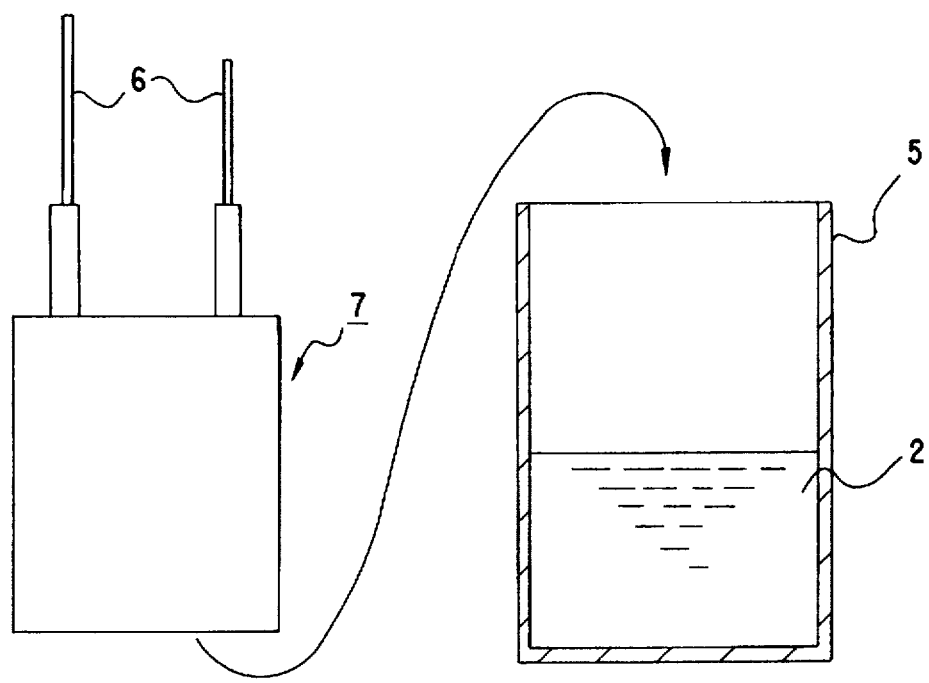
FIG. 13 is a diagram showing the step of impregnation for use in fabricating the conventional capacitor.
Figure 14:
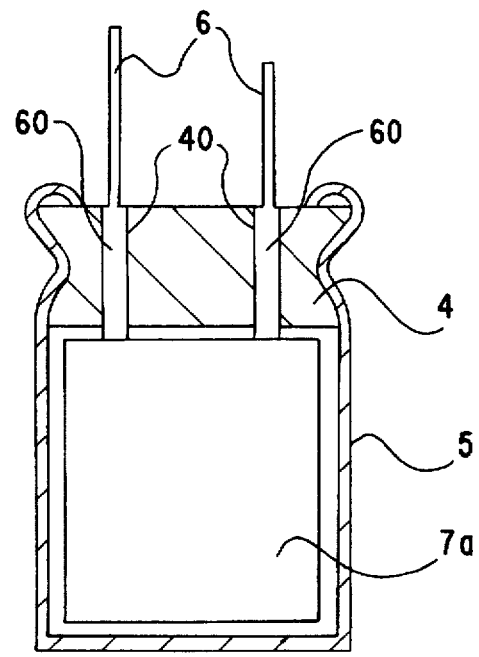
FIG. 14 is a view showing a conventional electrolytic capacitor with its case broken away.
Figure 15A:
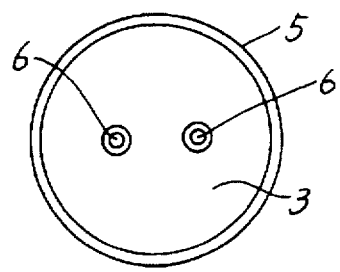
FIGS. 15 A, B and C are top views for illustrating lead terminals as displaced.
Figure 15B:
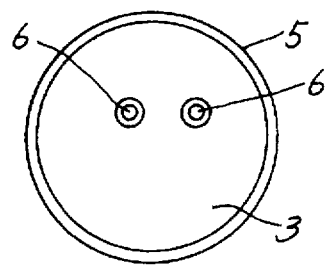
Figure 15C:
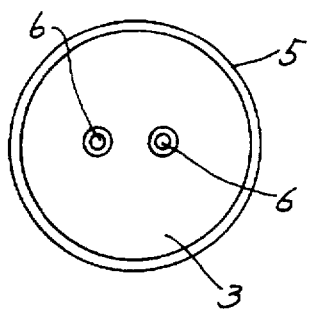
Figure 16:
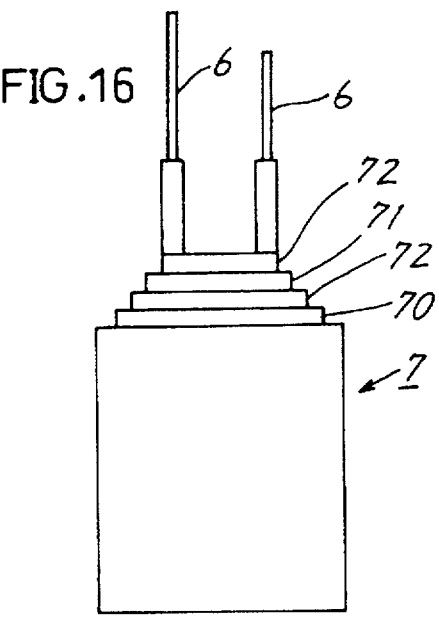
FIG. 16 is a view showing a capacitor element with loosening separator paper.

FIG. 9 shows a solid electrolyte capacitor 1 having a hollow portion 50 between its capacitor element 7 and case 5 and coated with an adhesive composition 31 not only over the lower surface of the element but also over the peripheral surface thereof. In the case of the present embodiment, a container 9 containing the adhesive composition 31 which is a liquid resin is prepared as shown in FIG. 10 in addition to the heating box 8 and the case 5. Unlike the solid electrolyte capacitor 1 of Embodiment 4, the capacitor element 7 as withdrawn from the heating box 8 and cooled is thereafter dipped in the liquid adhesive composition 31 within the container 9, whereby the composition 31 is applied to the lower surface and peripheral surface of the capacitor element 7. The element 7 is withdrawn from the container 9, the applied adhesive composition 31 is cured, a seal member 4 is then fitted on lead terminals 6, 6, and the element 7 is placed into a case 5. The capacitor element 7 may be dipped in the composition in the container 9 after the seal member 4 has been fitted on the lead terminals 6, 6.

The adhesive composition 31 in the container 9 consists mainly of an epoxy resin and is maintained at room temperature. The composition 31 applied is cured by being maintained at 85° C. for about 4 hours. The composition 31 as cured forms a 50-µm-thick coating over the peripheral surface of the capacitor element 7.

The coating of the adhesive composition 31 thus formed over the periphery of the capacitor element 7 obviates the likelihood of the element 7 loosening when the element 7 is placed into the case 5 like the composition used for the preceding embodiment. Furthermore, the composition prevents the lower surface and peripheral surface of the capacitor element 7 from coming into direct contact with the inner surface of the case 5 to result in the following advantage.

When the solid electrolyte capacitor is to be used for surface mounting, separator paper 72, anode foil 70 and cathode foil 71 of reduced width are used as the case may be to decrease the height. Accordingly, these components are liable to be rolled incompletely when made into a capacitor element 7, and the anode foil 70 or cathode foil 71 is likely to remain exposed. If the anode foil 70 comes into contact with the inner surface of the case 5 in this instance, the capacitor element 7 short-circuits, rendering the capacitor 1 faulty.

Further if rolled up improperly, the capacitor element 7 becomes similarly short-circuited to make the capacitor faulty when the lower surface or peripheral surface of the element 7 is brought into direct contact with the case inner surface by a pressure of the chip mounter (not shown) for surface mount or owing to thermal expansion during reflow soldering. Accordingly, the adhesive composition 31 applied to the lower surface and peripheral surface of the capacitor element 7 is effective for preventing the peripheral surface from coming into direct contact with the case inner surface to preclude short-circuiting.

The applicant prepared 1,000 capacitor elements 7 which were intentionally rolled up improperly and coated with the adhesive composition 31 over the lower surface and peripheral surface thereof, and 1,000 similar capacitor elements having no adhesive coating. Solid electrolyte capacitors 1 having a hollow portion 50 were then fabricated using these elements 7. Table 6 shows the yield of capacitors of each type free from short-circuiting.

TABLE 6

| Capacitors | Yield |
| --- | --- |
| With adhesive coating | 98% |
| Without adhesive coating | 93% |

The result demonstrates that the application of the adhesive composition 31 by the method used for the present embodiment diminishes the occurrence of rejects due to short-circuiting.

Table 7 shows the results of a mount test, reflow test and vibration test conducted for the two types of solid electrolyte capacitors 1 referred to in Table 6. For each of these tests, 500 capacitors of each type were used. For the mount test, a load of 800 g was applied to the bottom face of the capacitor 1 for 1 to 2 seconds, and the capacitor was thereafter checked for the occurrence of short-circuiting. For the reflow test, the capacitor 1 was subjected to a reflow process at a maximum temperature of 250° C. for 30 seconds and thereafter checked for short-circuiting. For the vibration test, the capacitor was subjected to a vibration having an amplitude of 1.5 mm and a frequency in the range of 10 to 2,000 Hz and varying every 20 minutes from three directions orthogonal to one another for 2 hours in each direction, and then checked for short-circuiting.

TABLE 7

| | Number of shorted capacitors/total number | | |
| --- | --- | --- | --- |
| Capacitors | Mount test | Reflow test | Vibration test |
| With adhesive coating | 0/500 | 0/500 | 0/500 |
| Without adhesive coating | 2/500 | 1/500 | 2/500 |

The data given in Table 7 also demonstrates that the application of the adhesive composition 31 to the lower surface and peripheral surface of the capacitor element 7 diminishes the occurrence of rejects due to short-circuiting.

The present invention is not limited to the construction of the foregoing embodiments but can be modified variously within the scope of the invention as defined in the appended claims.

For example, the applicant contemplates use of butyl rubber with a hardness of 84 as the material for the seal member 4 in the foregoing embodiments, whereas the rubber can of course be replaced by other materials.

What is claimed is:

1. A process for producing a solid electrolyte capacitor comprising a capacitor element formed by rolling up superposed anode foil and cathode foil with separator paper interposed therebetween, the capacitor element being enclosed as impregnated with an electrolyte in a case having an opening in one side, the opening of the case being closed with lead terminals projecting from the capacitor element to extend to the outside of the case through the closed opening, the process comprising the steps of:

placing the capacitor element into a heating box having an open upper side and containing a molten electrolyte and impregnating the capacitor element with the electrolyte, withdrawing the capacitor from the heating box and solidifying the electrolyte in the capacitor element by cooling, attaching the seal member fittable in the opening of the case to the lead terminals of the capacitor element containing the solidified electrolyte, and placing the capacitor element having the seal member fitted thereto into the case and closing the opening of the case by fitting the seal member in the opening of the case.

2. A process for producing a solid electrolyte capacitor as defined in claim 1 which comprises the step of applying a reinforcing material for reinforcing the lead terminals to an upper surface of the seal member after the step of attaching the seal member to the capacitor element by inserting the lead terminals of the capacitor element through the seal member.

3. A process for producing a solid electrolyte capacitor as defined in claim 1 which comprises the step of applying a reinforcing material for reinforcing the lead terminals to an upper surface of the capacitor element after the capacitor element is impregnated with the electrolyte.

4. A process for producing a solid electrolyte capacitor as defined in claim 1 wherein the capacitor element has its separator paper treated for carbonization first, and an adhesive composition is applied to at least one of an upper surface and a lower surface of the capacitor element before the step of placing the capacitor element into the heating box and impregnating the capacitor element with the electrolyte.

5. A process for producing a solid electrolyte capacitor as defined in claim 1 which comprises the step of applying an adhesive composition to a lower surface and peripheral surface of the capacitor element after the step of withdrawing the capacitor element from the heating box and before the step of placing the capacitor element into the case.

* * * * *